US011357012B2

(12) United States Patent
Chen et al.

(10) Patent No.: US 11,357,012 B2
(45) Date of Patent: Jun. 7, 2022

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 66 days.

(21) Appl. No.: 16/644,927

(22) PCT Filed: Sep. 8, 2017

(86) PCT No.: PCT/CN2017/101137
§ 371 (c)(1),
(2) Date: Mar. 5, 2020

(87) PCT Pub. No.: WO2019/047188
PCT Pub. Date: Mar. 14, 2019

(65) Prior Publication Data
US 2021/0051663 A1 Feb. 18, 2021

(51) Int. Cl.
*H04W 72/04* (2009.01)
*H04L 5/00* (2006.01)
(Continued)

(52) U.S. Cl.
CPC ....... *H04W 72/0493* (2013.01); *H04L 5/0051* (2013.01); *H04L 25/0226* (2013.01);
(Continued)

(58) Field of Classification Search
CPC ............. H04L 5/0051; H04L 25/0226; H04W 72/042; H04W 72/0453; H04W 72/0493; H04W 72/0833
See application file for complete search history.

(56) References Cited

U.S. PATENT DOCUMENTS 8,295,850 B2 * 10/2012 Vujcic ................... H04W 74/08
455/450
8,515,425 B2   8/2013 Rao
(Continued)

FOREIGN PATENT DOCUMENTS

CN     101904199 A    12/2010
CN     102150466 A     8/2011
(Continued)

OTHER PUBLICATIONS

CMCC, [Draft] LS on the support of supplementary uplink in NR, May 15, 2017, 3GPP TSG RAN WG1 Meeting #89, Tdoc: R1-1709813 (Year: 2017).*
(Continued)

*Primary Examiner* — Eric Nowlin
(74) *Attorney, Agent, or Firm* — Perkins Coie LLP (57) ABSTRACT

Embodiments of this application provide a wireless communication method, a network device, and a terminal device, to improve communication performance in terms of frequency band deployment and configuration. The method includes: determining, by a network device, a first uplink carrier, where the first uplink carrier is one of a plurality of uplink carriers that can be used for a terminal device; and sending, by the network device, configuration information to the terminal device, where the configuration information includes configuration information associated with the first uplink carrier.

14 Claims, 4 Drawing Sheets

(51) Int. Cl.
    *H04L 25/02*    (2006.01)
    *H04W 74/08*    (2009.01)
(52) U.S. Cl.
    CPC ..... *H04W 72/042* (2013.01); *H04W 72/0453* (2013.01); *H04W 74/0833* (2013.01)

(56) References Cited

U.S. PATENT DOCUMENTS

| | | | |
|---|---|---|---|
| 8,526,374 B2 | 9/2013 | Damnjanovic | |
| 9,370,003 B2 | 6/2016 | Damnjanovic et al. | |
| 10,694,409 B2* | 6/2020 | Ryu | H04W 24/08 |
| 10,945,290 B2* | 3/2021 | Jeon | H04W 36/0069 |
| 11,039,480 B2* | 6/2021 | Jeon | H04W 74/006 |
| 11,134,514 B2* | 9/2021 | Fei | H04W 74/004 |
| 2009/0163208 A1 | 6/2009 | Rao | |
| 2009/0203384 A1* | 8/2009 | Vujcic | H04W 74/08 455/450 |
| 2010/0067470 A1 | 3/2010 | Damnjanovic | |
| 2011/0250918 A1 | 10/2011 | Jen | |
| 2013/0336260 A1 | 12/2013 | Damnjanovic et al. | |
| 2015/0036601 A1 | 2/2015 | Kim et al. | |
| 2016/0302233 A1 | 10/2016 | Gopala Krishnan et al. | |
| 2016/0373225 A1 | 12/2016 | Kim et al. | |
| 2017/0244526 A1 | 8/2017 | Kim et al. | |
| 2018/0376510 A1* | 12/2018 | Sun | H04W 74/006 |
| 2019/0053080 A1* | 2/2019 | Ryu | H04L 5/0048 |
| 2019/0254074 A1* | 8/2019 | Jeon | H04W 74/004 |
| 2020/0037355 A1* | 1/2020 | Fei | H04W 52/242 |
| 2020/0053799 A1* | 2/2020 | Jeon | H04W 74/0833 |
| 2020/0128564 A1* | 4/2020 | Takeda | H04L 5/001 |
| 2020/0229180 A1* | 7/2020 | Liu | H04W 72/0453 |
| 2020/0280868 A1* | 9/2020 | Ryu | H04W 72/0413 |
| 2020/0351069 A1* | 11/2020 | Grant | H04B 7/0617 |
| 2020/0367289 A1* | 11/2020 | Choi | H04L 5/0053 |
| 2020/0374776 A1* | 11/2020 | Shih | H04W 36/0069 |
| 2021/0022176 A1* | 1/2021 | Yang | H04W 74/00 |
| 2021/0051663 A1* | 2/2021 | Chen | H04W 72/042 |
| 2021/0153253 A1* | 5/2021 | Wang | H04W 74/0833 |
| 2021/0160717 A1* | 5/2021 | Ryu | H04W 72/0413 |
| 2021/0227588 A1* | 7/2021 | Jeon | H04W 74/02 |
| 2022/0022250 A1* | 1/2022 | Cirik | H04W 74/085 |

FOREIGN PATENT DOCUMENTS

| | | | | |
|---|---|---|---|---|
| CN | 102150466 B | * | 7/2014 | ........ H04W 72/0453 |
| CN | 105491624 A | | 4/2016 | |
| CN | 111034324 A | * | 4/2020 | ............ H04W 74/04 |
| EP | 2351444 A2 | * | 8/2011 | ........ H04W 74/0866 |
| EP | 2775639 A1 | | 9/2014 | |
| EP | 2351444 B1 | * | 11/2018 | ........ H04W 74/0866 |
| EP | 3653014 A1 | * | 5/2020 | ............ H04L 5/0053 |
| EP | 3653014 A4 | * | 8/2020 | ............ H04W 24/08 |
| JP | 5373086 B2 | * | 12/2013 | ............ H04L 5/0053 |
| JP | 2014525711 A | | 9/2014 | |
| JP | 2020504532 A | | 2/2020 | |
| JP | 2020524942 A | | 8/2020 | |
| KR | 20110053386 A | * | 5/2011 | ........ H04W 74/0866 |
| KR | 20130036362 A | * | 4/2013 | ........ H04W 72/0453 |
| KR | 101287491 B1 | * | 7/2013 | ............ H04L 5/0053 |
| KR | 101298149 B1 | * | 8/2013 | ........ H04W 72/0453 |
| KR | 102305906 B1 | * | 8/2017 | |
| KR | 20190017136 A | * | 2/2019 | ............ H04L 5/0053 |
| WO | WO-2010030935 A2 | * | 3/2010 | ........ H04W 74/0866 |
| WO | WO-2010030935 A3 | * | 5/2010 | ............ H04L 5/0094 |
| WO | 2016164148 A1 | | 10/2016 | |
| WO | 2017041683 A1 | | 3/2017 | |
| WO | WO-2019031756 A1 | * | 2/2019 | ............ H04W 24/08 |
| WO | WO-2019098710 A1 | * | 5/2019 | ........... H04B 17/318 |
| WO | WO-2019245430 A1 | * | 12/2019 | ............ H04W 72/02 |

OTHER PUBLICATIONS

CMCC, [Draft] LS on the support of supplementary uplink in NR, May 15, 2017, 3GPP TSG RAN WG1 Meeting #89, Tdoc: R1-1709843 (Year: 2017).*
Huawei et al., UL power control for SUL and LTE-NR uplink coexistence with UL sharing, Aug. 21, 2017, 3GPP TSG RAN WG1 Meeting #90, Tdoc: R1-1712164 (Year: 2017).*
Huawei et al., Initial access and uplink operations with SUL, Aug. 21, 2017, 3GPP TSG RAN WG1 Meeting #90, Tdoc: R1-1712165 (Year: 2017).*
Huawei et al., WF on initial access with SUL, Aug. 21, 2017, 3GPP TSG RAN WG1 Meeting #90, Tdoc: R1-1715152 (Year: 2017).*
Huawei et al., WF on uplink operation with SUL for LTE-NR UL Coexistence, Aug. 21, 2017, 3GPP TSG RAN WG1 Meeting #90, Tdoc: R1-1715189 (Year: 2017).*
CMCC, System Information for supporting the supplementary uplink (SUL) frequency, Jun. 27, 2017, 3GPP TSG-RAN WG2 NR AdHoc, Tdoc: R2-1707461 (Year: 2017).*
MediaTek Inc., Support Initial Access on Supplementary Uplink, Aug. 21, 2017, 3GPP TSG-RAN WG2 Meeting #99, Tdoc: R2-1708050 (Year: 2017).*
Samsung, On supporting the supplementary uplink frequency, Aug. 21, 2017, 3GPP TSG-RAN WG2 Meeting #99, Tdoc: R2-1708895 (Year: 2017).*
CMCC, Considerations on support of supplementary uplink frequency, Aug. 21, 2017, 3GPP TSG-RAN WG2 Meeting #99, Tdoc: R2-1709093 (Year: 2017).*
International Search Report in the international application No. PCT/CN2017/101137, dated Mar. 28, 2018.
Supplementary International Search Report in the international application No. PCT/CN2017/101137, dated May 13, 2020.
Written Opinion of the International Search Authority in the international application No. PCT/CN2017/101137, dated Mar. 28, 2018.
CMCC. "Way forward on the support of Supplementary Uplink in NR", 3GPP TSG RAN WG1 Meeting #89 R1-1709732, published on May 15-19, 2017.
3rd Generation Partnership Project; Technical Specification Group Radio Access Network; Evolved Universal Terrestrial Radio Access (E-UTRA); Medium Access Control (MAC) protocol specification(Release 14), 3GPP TS 36.321 V14.0.0, Sep. 2016.
First Office Action of the Chilean application No. 202000560, dated May 19, 2021.
First Office Action of the Chinese application No. 202010313107.7, dated Jun. 17, 2021.
3GPP TSG RAN WG1 Meeting NR Adhoc R1-1710774, Qingdao, China, Jun. 27-30, 2017, Source:CMCC, Title: Discussion on RACH configuration, Agenda Item:5.1.1.4.4, Document for:Discussion and Decision. 3 pages.
First Office Action of the Japanese application No. 2020-513801, dated Aug. 17, 2021 8 pages with English translation.
European Search Report in the European application No. 21189643. 6, dated Oct. 21, 2021. 7 pages.
Second Office Action of the Chilean application No. 202000560, dated Sep. 21, 2021. 17 pages with English translation.
First Office Action of the Indian application No. 202017015038, dated Nov. 2, 2021. 7 pages with English translation.
Second Office Action of the Chinese application No. 202010313107. 7, dated Sep. 1, 2021. 11 pages with English translation.
First Office Action of the Taiwanese application No. 107131636, dated Sep. 30, 2021. 13 pages with English translation.
First Office Action of the Korean application No. 10-2020-7009236, dated Nov. 29, 2021. 9 pages with English translation.
Third Office Action of the Chinese application No. 202010313107. 7, dated Dec. 22, 2021. 9 pages with English translation.
Second Office Action of the Japanese application No. 2020-513801, dated Mar. 25, 2022. 10 pages with English translation.
ZTE, Multiple SS blocks in wideband CC[online], 3GPP TSG RAN WG1 #90 R1-1712058, Internet<URL:http://www.3gpp.org/ftp/tsg_ran/WG1_RL1/TSGR1_90/Docs/R1-1712058.zip>, Aug. 25, 2017. 5 pages.

* cited by examiner

WIRELESS COMMUNICATION METHOD, NETWORK DEVICE, AND TERMINAL DEVICE

CROSS-REFERENCE TO RELATED APPLICATIONS

The present application is a U.S. National Phase Entry of International PCT Application No. PCT/CN2017/101137 filed on Sep. 8, 2017, and named after "WIRELESS COMMUNICATION METHOD, NETWORK DEVICE, AND TERMINAL DEVICE", the content of which is hereby incorporated by reference in its entirety.

BACKGROUND

Technical Field

This application relates to the communications field, and more specifically, to a wireless communication method, a network device, and a terminal device.

Related Art

In a Long Term Evolution (Long Term Evolution, LTE) system, there are a fixed uplink carrier and a fixed downlink carrier (the uplink carrier and the downlink carrier may at least partially overlap in frequency domain). A terminal device and a network may perform uplink and downlink communication by using the fixed uplink carrier and downlink carrier respectively.

A future communications system requires relatively high communication performance.

Therefore, how to improve communication performance in terms of carrier deployment and configuration is a problem that needs to be resolved urgently.

SUMMARY

Embodiments of this application provide a wireless communication method and a device, to improve communication performance in terms of carrier deployment and configuration.

A first aspect provides a wireless communication method, including:

determining, by a network device, a first uplink carrier, where the first uplink carrier is one of a plurality of uplink carriers that can be used for a terminal device; and sending, by the network device, configuration information to the terminal device, where the configuration information includes configuration information associated with the first uplink carrier.

With reference to the first aspect, in a possible implementation of the first aspect, the sending, by the network device, configuration information to the terminal device includes:

sending, by the network device, the configuration information to a plurality of terminal devices by using broadcast signaling, remaining minimum system information RMSI or system information.

With reference to the first aspect or any possible implementation described above, in another possible implementation of the first aspect, the sending, by the network device, configuration information to the terminal device includes:

sending, by the network device, the configuration information to a single terminal device by using high layer signaling.

With reference to the first aspect or any possible implementation described above, in another possible implementation of the first aspect, the configuration information includes resource information of the first uplink carrier.

With reference to the first aspect or any possible implementation described above, in another possible implementation of the first aspect, the resource information includes carrier position information of the first uplink carrier.

With reference to the first aspect or any possible implementation described above, in another possible implementation of the first aspect, the resource information includes bandwidth information of the first uplink carrier.

With reference to the first aspect or any possible implementation described above, in another possible implementation of the first aspect, the bandwidth information includes an actually used bandwidth of the first uplink carrier, an initial access bandwidth of the first uplink carrier or a reference bandwidth of a relative reference object of the first uplink carrier.

With reference to the first aspect or any possible implementation described above, in another possible implementation of the first aspect, the configuration information includes configuration information for transmitting a sounding reference signal SRS on the first uplink carrier.

With reference to the first aspect or any possible implementation described above, in another possible implementation of the first aspect, the configuration information includes configuration information for transmitting a physical uplink shared channel PUSCH or physical uplink control channel PUCCH on the first uplink carrier.

With reference to the first aspect or any possible implementation described above, in another possible implementation of the first aspect, the configuration information is used to indicate a random access resource and/or a random access code for a random access process on the first uplink carrier.

With reference to the first aspect or any possible implementation described above, in another possible implementation of the first aspect, the configuration information indicates a frequency domain position of the random access resource relative to a reference carrier position.

With reference to the first aspect or any possible implementation described above, in another possible implementation of the first aspect, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

With reference to the first aspect or any possible implementation described above, in another possible implementation of the first aspect, configuration signaling to which the configuration information belongs is further used to indicate: a random access resource and/or a random access code for a random access process on at least one second uplink carrier.

With reference to the first aspect or any possible implementation described above, in another possible implementation of the first aspect, the method further includes:

sending, by the network device, indication information to the terminal device, where the indication information indicates a parameter used to select an uplink carrier during random access.

With reference to the first aspect or any possible implementation described above, in another possible implementation of the first aspect, the parameter is used for the terminal device to acquire a DL signal threshold corresponding to an uplink carrier, so that the terminal device selects the corresponding uplink carrier for a random access process based on a relationship between a DL signal measurement result and the DL signal threshold.

With reference to the first aspect or any possible implementation described above, in another possible implementation of the first aspect, the indication information is carried in the configuration signaling to which the configuration information belongs; or the indication information is sent by using broadcast signaling, RMSI or system information.

With reference to the first aspect or any possible implementation described above, in another possible implementation of the first aspect, the random access process is a contention-free random access process.

With reference to the first aspect or any possible implementation described above, in another possible implementation of the first aspect, the plurality of uplink carriers that can be used for the terminal device respectively belongs to a plurality of different frequency bands.

With reference to the first aspect or any possible implementation described above, in another possible implementation of the first aspect, a frequency band to which the first uplink carrier belongs is lower than frequency bands to which other uplink carriers belong.

A second aspect provides a wireless communication method, including:

receiving, by a terminal device, configuration information sent by a network device, where the configuration information includes configuration information associated with a first uplink carrier, and the first uplink carrier is one of a plurality of uplink carriers that can be used for the terminal device; and performing, by the terminal device, uplink transmission on the first uplink carrier based on the configuration information.

With reference to the second aspect, in a possible implementation of the second aspect, the receiving, by a terminal device, configuration information sent by a network device includes:

receiving, by the terminal device, the configuration information sent by the network device by using broadcast signaling, remaining minimum system information RMSI or system information.

With reference to the second aspect or any possible implementation described above, in another possible implementation of the second aspect, the receiving, by a terminal device, configuration information sent by a network device includes:

receiving, by the terminal device, the configuration information sent by the network device by using high layer signaling.

With reference to the second aspect or any possible implementation described above, in another possible implementation of the second aspect, the configuration information includes resource information of the first uplink carrier.

With reference to the second aspect or any possible implementation described above, in another possible implementation of the second aspect, the resource information includes carrier position information of the first uplink carrier.

With reference to the second aspect or any possible implementation described above, in another possible implementation of the second aspect, the resource information includes bandwidth information of the first uplink carrier.

With reference to the second aspect or any possible implementation described above, in another possible implementation of the second aspect, the bandwidth information includes an actually used bandwidth of the first uplink carrier, an initial access bandwidth of the first uplink carrier or a reference bandwidth of a relative reference object of the first uplink carrier.

With reference to the second aspect or any possible implementation described above, in another possible implementation of the second aspect, the configuration information includes configuration information for transmitting a sounding reference signal SRS on the first uplink carrier.

With reference to the second aspect or any possible implementation described above, in another possible implementation of the second aspect, the configuration information includes configuration information for transmitting a physical uplink shared channel PUSCH or physical uplink control channel PUCCH on the first uplink carrier.

With reference to the second aspect or any possible implementation described above, in another possible implementation of the second aspect, the configuration information is used to indicate a random access resource and/or a random access code for a random access process on the first uplink carrier.

With reference to the second aspect or any possible implementation described above, in another possible implementation of the second aspect, the configuration information indicates a frequency domain position of the random access resource relative to a reference carrier position.

With reference to the second aspect or any possible implementation described above, in another possible implementation of the second aspect, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

With reference to the second aspect or any possible implementation described above, in another possible implementation of the second aspect, configuration signaling to which the configuration information belongs is further used to indicate: a random access resource and/or a random access code for a random access process on at least one second uplink carrier.

With reference to the second aspect or any possible implementation described above, in another possible implementation of the second aspect, the method further includes:

receiving, by the terminal device, indication information sent by the network device, where the indication information indicates a parameter used to select an uplink carrier during random access; and before the performing, by the terminal device, uplink transmission on the first uplink carrier based on the configuration information, the method further includes:

determining, by the terminal device based on the parameter, to perform uplink transmission on the first uplink carrier.

With reference to the second aspect or any possible implementation described above, in another possible implementation of the second aspect, the parameter is used for the terminal device to acquire a DL signal threshold corresponding to an uplink carrier; and the determining, by the terminal device based on the parameter, to perform uplink transmission on the first uplink carrier includes:

determining, by the terminal device based on a relationship between a DL signal measurement result and the DL signal threshold, to perform uplink transmission on the first uplink carrier.

With reference to the second aspect or any possible implementation described above, in another possible implementation of the second aspect, the indication information is carried in the configuration signaling to which the configuration information belongs; or the indication information is sent by using broadcast signaling, RMSI or system information.

With reference to the second aspect or any possible implementation described above, in another possible implementation of the second aspect, the random access process is a contention-free random access process.

With reference to the second aspect or any possible implementation described above, in another possible implementation of the second aspect, the plurality of uplink carriers that can be used for the terminal device respectively belongs to a plurality of different frequency bands.

With reference to the second aspect or any possible implementation described above, in another possible implementation of the second aspect, a frequency band to which the first uplink carrier belongs is lower than frequency bands to which other uplink carriers belong.

A third aspect provides a network device, configured to perform the foregoing method in the first aspect or any possible implementation of the first aspect. Specifically, the network device includes functional modules configured to perform the foregoing method in the first aspect or any possible implementation of the first aspect.

A fourth aspect provides a terminal device, configured to perform the foregoing method in the second aspect or any possible implementation of the second aspect. Specifically, the terminal device includes functional modules configured to perform the foregoing method in the second aspect or any possible implementation of the second aspect.

A fifth aspect provides a network device, including a processor, a memory, and a transceiver. The processor, the memory, and the transceiver communicate with each other through internal connection channels to transfer control and/or data signals, to enable the network device to perform the foregoing method in the first aspect or any possible implementation of the first aspect.

A sixth aspect provides a terminal device, including a processor, a memory, and a transceiver. The processor, the memory, and the transceiver communicate with each other through internal connection channels to transfer control and/or data signals, to enable a network device to perform the foregoing method in the second aspect or any possible implementation of the second aspect.

A ninth aspect provides a computer readable medium, configured to store a computer program, the computer program including an instruction used to perform any method in the foregoing or the method in any possible implementation.

A tenth aspect provides a computer program product including an instruction, where the instruction, when running on a computer, enables the computer to perform any method in the foregoing or the method in any possible implementation.

Therefore, in the embodiments of this application, the plurality of uplink carriers may be used for uplink transmission of the terminal device, and one of the plurality of uplink carriers may be configured, so that uplink transmission of the terminal device can be more flexible, thereby improving communication performance.

BRIEF DESCRIPTION OF THE DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DETAILED DESCRIPTION

The technical solutions in the embodiments of this application are described with reference to the accompanying drawings in the embodiments of this application below. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short), a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a future 5G system (which may also be referred to as a New Radio (New Radio, NR) system), or the like.

It should be understood that terms "system" and "network" in this specification are usually interchangeably used in this specification. The term "and/or" in this specification is only an association relationship for describing the associated objects, and represents that three relationships may exist. For example, A and/or B may represent the following three cases: only A exists, both A and B exist, and only B exists. In addition, the character "/" in this specification generally indicates an "or" relationship between the associated objects.

Figure 1:
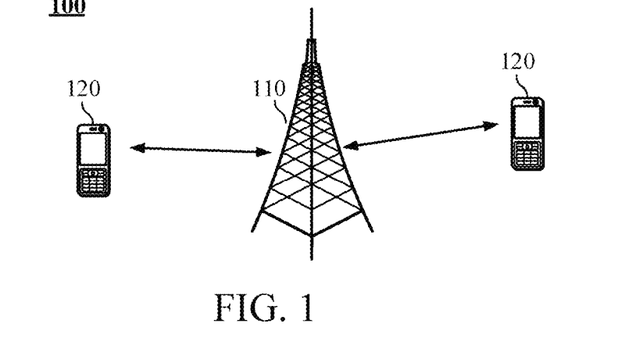
FIG. 1 is a schematic diagram of a wireless communications system according to an embodiment of this application.

FIG. 1 shows a wireless communications system 100 according to an embodiment of this application.

It should be understood that FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller or a mobility management entity. This is not limited in this embodiment of this application.

As shown in FIG. 1, the wireless communications system 100 may include a network device 110. The network device 100 may be a device communicating with a terminal device. The network device 100 may provide communication coverage for a specific geographic area, and may communicate with a terminal device (for example, UE) located within the coverage area. Optionally, the network device 100 may be a base transceiver station (Base Transceiver Station, BTS) in a GSM system or a CDMA system, may be a NodeB (NodeB, NB) in a WCDMA system, or may be an evolved Node B (Evolutional Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage area of the network device 110. The terminal device 120 may be mobile or fixed. Optionally, the terminal device 120 may be an access terminal, user equipment (User Equipment, UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a future evolved PLMN, or the like.

Optionally, the terminal device 120 may perform device to device (Device to Device, D2D) communication.

Optionally, a 5G system or network may be further referred to as a new radio (New Radio, NR) system or network.

A high frequency band is an important alternative frequency band for deploying a 5G (NR) network. Because a frequency band is relatively high, a coverage area is relatively limited (as compared with low frequency LTE). In a downlink (Downlink, DL), because a base station has a relatively high transmit power, large-scale multiple input multiple output (Multiple Input Multiple Output, MIMO) (hybrid Beamforming) or the like improves DL coverage. Because UE has a limited transmit power, UL coverage will become the bottleneck.

Therefore, one uplink (Uplink, UL) carrier may be deployed at a low frequency and used to perform NR transmission. The UL carrier may be referred to as a supplementary uplink (Supplementary Uplink, SUL) carrier. In this case, NR has at least two UL carriers. To be specific, one UL carrier is the SUL carrier, and the other UL carrier is a high frequency UL carrier (which is referred to as an NR dedicated (dedicated) UL carrier).

Figure 2:
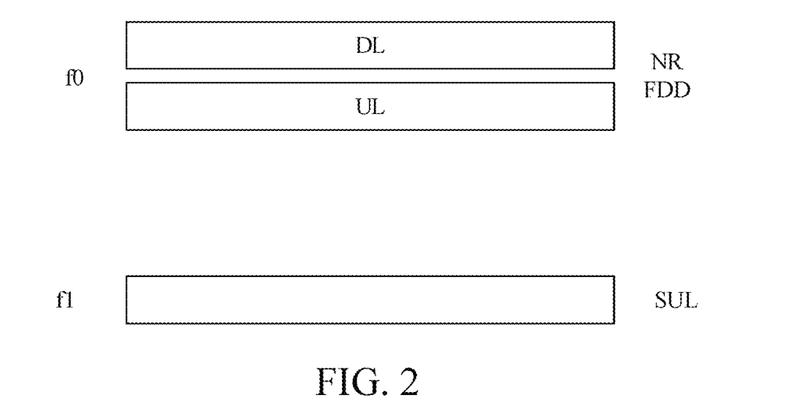
FIG. 2 is a schematic diagram of a link carrier in terms of resource allocation according to an embodiment of this application.
Figure 3:
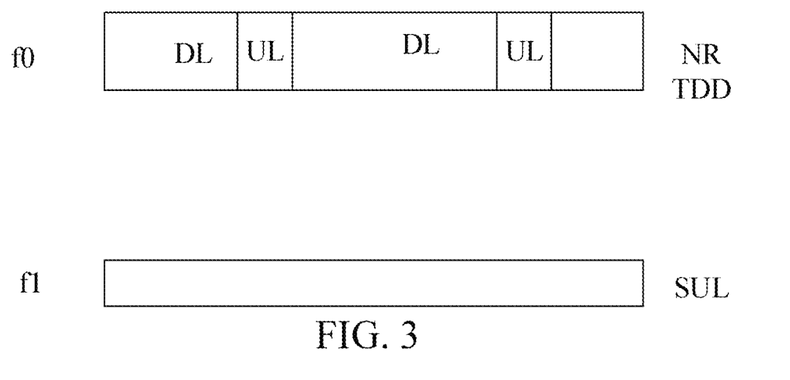
FIG. 3 is a schematic diagram of a link carrier in terms of resource allocation according to an embodiment of this application.

For example, as shown in FIG. 2 and FIG. 3, the NR system may include a high frequency UL carrier that belongs to a frequency band f0 and a low frequency UL carrier that belongs to a frequency band f1.

As shown in FIG. 2, frequency division multiplexing (Frequency Division Duplexing, FDD) is performed on the high frequency UL carrier that belongs to the frequency band f0 and a high frequency DL carrier that belongs to the frequency band f0. Alternatively, as shown in FIG. 3, time division multiplexing (Time Division Duplexing, TDD) is performed on the high frequency UL carrier that belongs to the frequency band f0 and a high frequency DL carrier that belongs to the frequency band f1.

Figure 4:
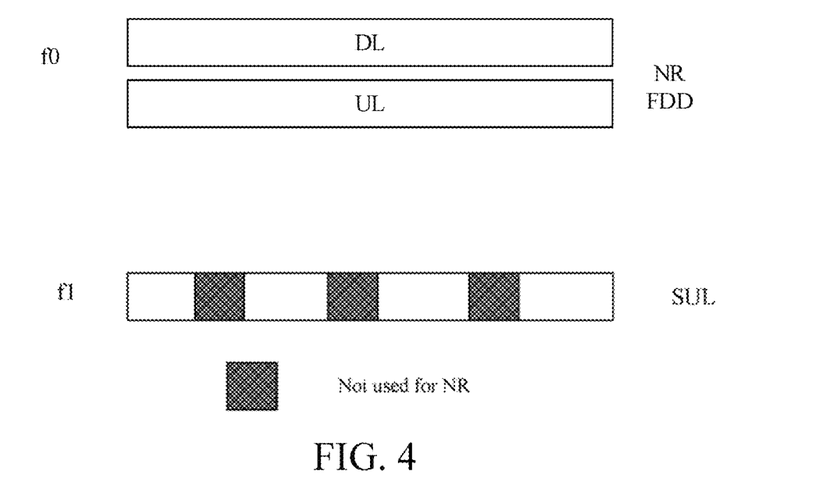
FIG. 4 is a schematic diagram of a link carrier in terms of resource allocation according to an embodiment of this application.
Figure 5:
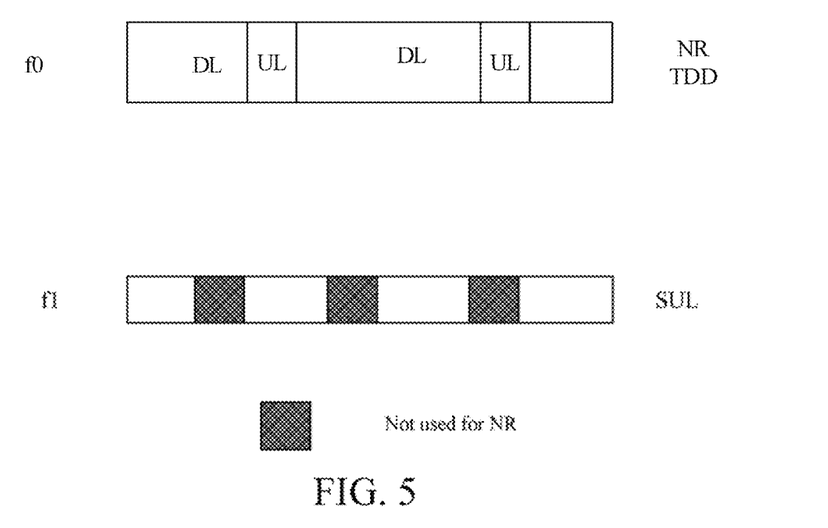
FIG. 5 is a schematic diagram of a link carrier in terms of resource allocation according to an embodiment of this application.

Optionally, the SUL carrier may further share a spectrum resource with the LTE system. To be specific, in f1, only some resources may be used for NR, and the other resources are used for LTE. Resources may be shared in a frequency division multiplexing (Frequency Division Multiplexing, FDM) or a time division multiplexing (Time Division Multiplexing, TDM) manner (for example, a TDM manner shown in FIG. 4 and FIG. 5).

It should be understood that although in the foregoing, an example in which the NR system has two UL carriers is used for description, this embodiment of this application is not limited thereto. For example, the NR system may alternatively have three or more UL carriers.

It should be further understood that in this embodiment of this application, a plurality of UL carriers included in the NR system may all be used by the terminal device to perform uplink transmission. However, during configuration, it may be only configured that the terminal device uses some UL carriers to perform uplink transmission.

Optionally, a quantity of UL carriers used by the terminal device and a specific UL carrier that are configured by the network device may change dynamically.

In view of this, the embodiments of this application provide a wireless communication method in the following, to resolve wireless communication in a scenario in which a network supports a plurality of UL carriers.

Figure 6:
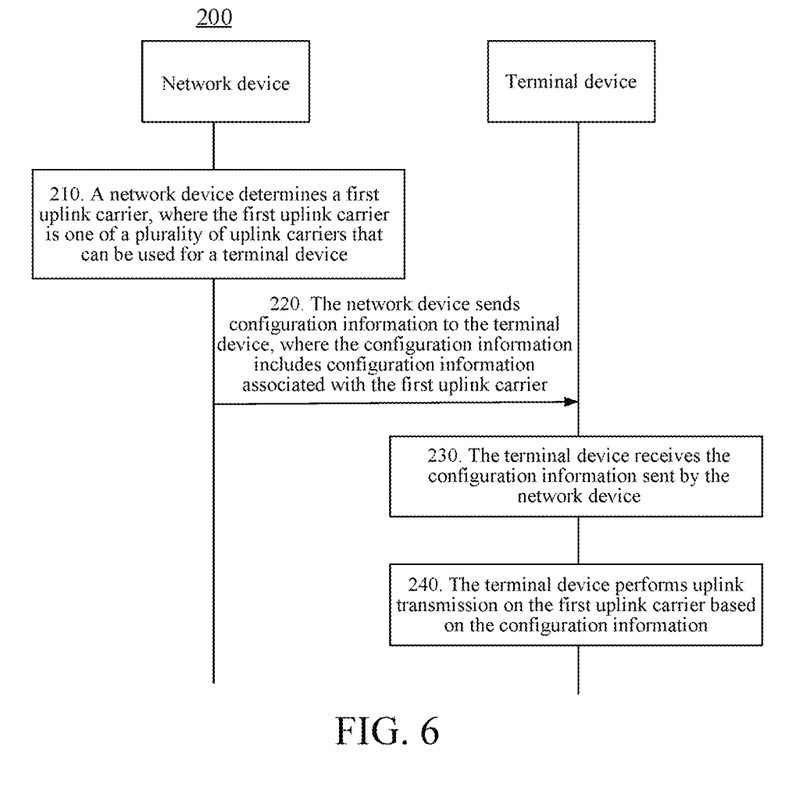
FIG. 6 is a schematic flowchart of a wireless communication method according to an embodiment of this application.

FIG. 6 is a schematic flowchart of a wireless communication method 200 according to an embodiment of this application. The method 200 may be optionally applied to the system shown in FIG. 1, but is not limited thereto. The method 200 includes at least some content in the following.

210. A network device determines a first uplink carrier, where the first uplink carrier is one of a plurality of uplink carriers that can be used for a terminal device.

Optionally, the plurality of uplink carriers that can be used for the terminal device means that the plurality of uplink carriers can be selected or configured for uplink transmission of the terminal device, but this does not represent that the terminal device needs to use the plurality of uplink carriers to perform uplink transmission.

Optionally, the plurality of uplink carriers that can be used for the terminal device respectively belongs to a plurality of different frequency bands.

Optionally, any two of the plurality of uplink carriers may partially overlap in frequency domain or do not overlap at all.

Optionally, a frequency band to which the first uplink carrier belongs is lower than frequency bands to which other uplink carriers belong. For example, the first uplink carrier may be the SUL carrier shown in FIG. 2 to FIG. 5.

The uplink carrier in this embodiment of this application may also be referred to as the uplink carrier.

220. The network device sends configuration information to the terminal device, where the configuration information includes configuration information associated with the first uplink carrier.

Optionally, the network device sends the configuration information to a plurality of terminal devices by using broadcast signaling, remaining minimum system information (Remaining Minimum System Information, RMSI) or system information.

Optionally, the network device sends the configuration information to a single terminal device by using high layer signaling.

For example, the network device may send the configuration information to a single terminal device by using a radio resource control (Radio Resource Control, RRC) command or a media access control (Media Access Control, MAC) control element (Control Element, CE).

230. The terminal device receives the configuration information sent by the network device.

240. The terminal device performs uplink transmission on the first uplink carrier based on the configuration information.

Therefore, in this embodiment of this application, the plurality of uplink carriers may be used for uplink transmission of the terminal device, and one of the plurality of uplink carriers may be configured, so that uplink transmission of the terminal device can be more flexible, thereby improving communication performance.

Optionally, in this embodiment of this application, the configuration information includes resource information of the first uplink carrier. Therefore, the terminal device may determine a resource of the first uplink carrier based on the resource information included in the configuration information, to perform uplink transmission.

Optionally, the resource information includes carrier position information of the first uplink carrier. The carrier position information may include a frequency band to which the carrier belongs.

Optionally, the resource information includes bandwidth information of the first uplink carrier.

The bandwidth information may include an actually used bandwidth of the first uplink carrier, an initial access bandwidth of the first uplink carrier or a reference bandwidth (for example, a bandwidth of a size starting from a reference point) of a relative reference object of the first uplink carrier.

Optionally, the configuration information includes configuration information for transmitting a sounding reference signal (Sounding Reference Signal, SRS) on the first uplink carrier. Therefore, the terminal device may transmit the SRS based on the configuration information.

Optionally, the configuration information includes configuration information for transmitting a physical uplink shared channel (Physical Uplink Shared Channel, PUSCH) or physical uplink control channel (Physical Uplink Control Channel, PUCCH) on the first uplink carrier. Therefore, the terminal device may transmit the PUSCH or PUCCH based on the configuration information.

Optionally, the configuration information is used to indicate a random access resource and/or a random access code for a random access process on the first uplink carrier. The random access resource for the random access process on the first uplink carrier may be some of the resources included in the first uplink carrier.

Optionally, the configuration information indicates a frequency domain position of the random access resource relative to a reference carrier position.

Optionally, the reference carrier position is a carrier position of the first uplink carrier; or the reference carrier position is a carrier position of an uplink carrier other than the first uplink carrier of the plurality of uplink carriers; or the reference carrier position is a carrier position of a downlink carrier of the terminal device.

Certainly, the reference carrier position in this embodiment of this application may alternatively be another position.

Optionally, configuration signaling to which the configuration information belongs is further used to indicate: a random access resource and/or a random access code for a random access process on at least one second uplink carrier. The random access resource and/or the random access code for the random access process on the first uplink carrier may be the same as the random access resource and/or the random access code for the random access process on the second uplink carrier. The random access code in this embodiment of this application may be referred to as a random access preamble (Preamble).

That is, the network device may send random access resources and/or access codes for a random access process that are configured for the plurality of uplink carriers, so that the network device may select an uplink carrier for random access, and use the random access resource and/or the access code corresponding to the selected uplink carrier to perform random access.

Optionally, the terminal device may select an uplink carrier for random access based on a specific parameter.

For example, the specific parameter may be used for the terminal device to acquire a DL signal threshold corresponding to an uplink carrier, so that the terminal device selects the corresponding uplink carrier for a random access process based on a relationship between a downlink carrier (Downlink, DL) signal measurement result and the DL signal threshold.

For example, a value corresponding to the DL signal threshold includes a. When a value of a DL signal is greater than or equal to a, the first uplink carrier is selected to perform random access, and when the value of the DL signal is less than a, the second uplink carrier is selected to perform random access.

Optionally, the parameter used to select an uplink carrier during random access may be sent by the network device to the terminal device by using the indication information. The parameter may directly indicate the foregoing DL signal threshold, or a parameter used to indirectly obtain the DL signal threshold may be provided.

The indication information is carried in the foregoing configuration signaling to which the configuration information belongs; or the indication information is sent independently from the foregoing configuration information by using broadcast signaling, RMSI or system information.

Optionally, the parameter used to select an uplink carrier during random access may be preset on the terminal device.

Optionally, the random access process described in this embodiment of this application is a contention-free (contention-free) random access process.

Figure 7:
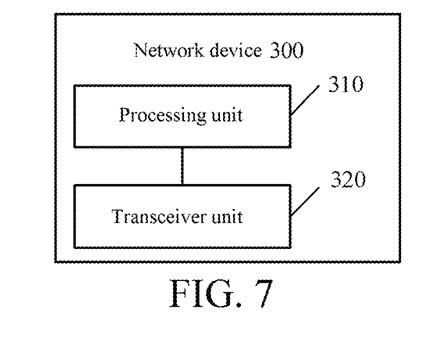
FIG. 7 is a schematic block diagram of a network device according to an embodiment of this application.

FIG. 7 is a schematic block diagram of a network device 300 according to an embodiment of this application. As shown in FIG. 7, the network device 300 includes a processing unit 310 and a transceiver unit 320.

The processing unit 310 is configured to determine a first uplink carrier, where the first uplink carrier is one of a plurality of uplink carriers that can be used for a terminal device.

The transceiver unit 320 is configured to send configuration information to the terminal device, where the configuration information includes configuration information associated with the first uplink carrier.

It should be understood that the network device 300 may perform corresponding operations performed by the network device in the foregoing method embodiment. For brevity, details are not described herein again.

Figure 8:
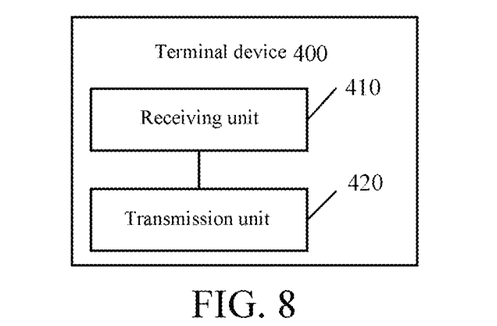
FIG. 8 is a schematic block diagram of a terminal device according to an embodiment of this application.

FIG. 8 is a schematic block diagram of a terminal device 400 according to an embodiment of this application.

As shown in FIG. 8, the terminal device 400 includes a receiving unit 410 and a transmission unit 420. The receiving unit 410 is configured to receive configuration information sent by a network device, where the configuration information includes configuration information associated with a first uplink carrier, and the first uplink carrier is one of a plurality of uplink carriers that can be used for the terminal device. The transmission unit 420 is configured to perform uplink transmission on the first uplink carrier based on the configuration information.

It should be understood that the terminal device 400 may perform corresponding operations performed by the terminal device in the foregoing method embodiment. For brevity, details are not described herein again.

Figure 9:
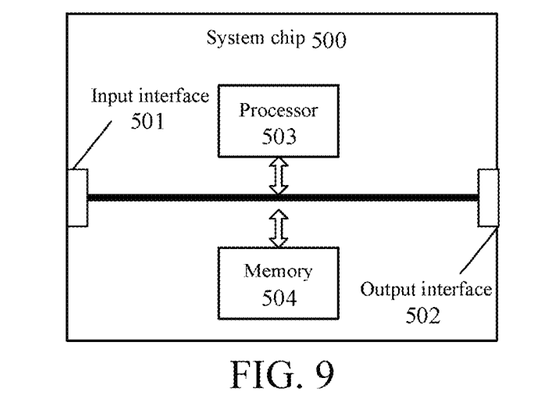
FIG. 9 is a schematic block diagram of a system chip according to an embodiment of this application.

FIG. 9 is a schematic structural diagram of a system chip 500 according to an embodiment of this application. The system chip 500 in FIG. 9 includes an input interface 501, an output interface 502, a processor 503, and a memory 504 that may be connected through an internal communication connection line, where the processor 503 is configured to execute code in the memory 504.

Optionally, when the code is executed, the processor 503 implements the method performed by the network device in the method embodiment. For brevity, details are not described herein again.

Optionally, when the code is executed, the processor 503 implements the method performed by the terminal device in the method embodiment. For brevity, details are not described herein again.

Figure 10:
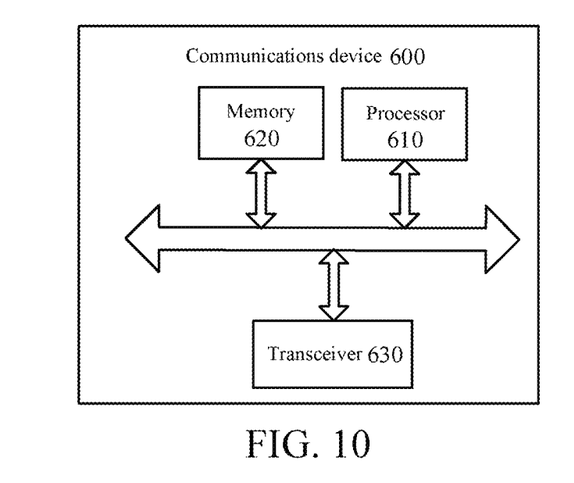
FIG. 10 is a schematic block diagram of a communications device according to an embodiment of this application.

FIG. 10 is a schematic block diagram of a communications device 600 according to an embodiment of this application. As shown in FIG. 10, the communications device 600 includes a processor 610 and a memory 620. The memory 620 may store program code, and the processor 610 may execute the program code stored in the memory 620.

Optionally, as shown in FIG. 10, the communications device 600 may include a transceiver 630, and the processor 610 may control the transceiver 630 to communicate externally.

Optionally, the processor 610 may invoke the program code stored in the memory 620 to perform corresponding operations of the network device in the method embodiment. For brevity, details are not described herein again.

Optionally, the processor 610 may invoke the program code stored in the memory 620 to perform corresponding operations of the terminal device in the method embodiment. For brevity, details are not described herein again.

It should be understood that the processor in the embodiments of this application may be an integrated circuit chip and has a signal processing capability. During implementation, the steps in the foregoing method embodiment may be implemented by using an integrated logic circuit of hardware in the processor or an instruction in the form of software. The processor may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. The methods, steps, and logic block diagrams disclosed in the embodiments of this application may be implemented or performed. The general-purpose processor may be a microprocessor or the processor may alternatively be any conventional processor or the like. The steps in the methods disclosed with reference to the embodiments of this application may be directly performed or completed by a decoding processor embodied as hardware or performed or completed by using a combination of hardware and software modules in a decoding processor. The software module may be located at a random-access memory, a flash memory, a read-only memory, a programmable read-only memory or an electrically erasable programmable memory, a register or another mature storage medium in this field. The storage medium is located at a memory, and the processor reads information in the memory and completes the steps in the foregoing methods in combination with the hardware thereof.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random-access memory (Random-access memory, RAM) and is used as an external cache. For exemplary rather than limitative description, many forms of RAMs can be used, for example, a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Rambus random-access memory (Direct Rambus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash disk, a removable hard disk, a read-only memory (Read-Only Memory, ROM), a random-access memory (Random-access memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   receiving, by a terminal device, configuration information sent by a network device,
      wherein the configuration information comprises resource information associated with a first uplink carrier that is one of a plurality of uplink carriers that can be used for the terminal device, and
      wherein the resource information comprises (i) carrier position information of the first uplink carrier and (ii) bandwidth information of the first uplink carrier, the bandwidth information comprising an initial access bandwidth of the first uplink carrier or a reference bandwidth of a relative reference object of the first uplink carrier; and
      wherein a parameter is used for the terminal device to acquire a DL signal threshold corresponding to an uplink carrier; and
      wherein the terminal device determines, based on the parameter, to perform uplink transmission on the first uplink carrier;
   determining, by the terminal device based on a relationship between a DL signal measurement result and the DL signal threshold, to perform the uplink transmission on the first uplink carrier; and
   performing, by the terminal device, the uplink transmission on the first uplink carrier based on the configuration information,
   wherein when a value of a DL signal is greater than or equal to the DL signal threshold, the first uplink carrier is selected to perform a random access process, and when the value of the DL signal is less than the DL signal threshold, a second uplink carrier is selected to perform the random access process; and
   wherein the first uplink carrier has a first random access code the same as a second random access code of the second uplink carrier.

2. The method according to claim 1, wherein the receiving, by a terminal device, configuration information sent by a network device comprises:
   receiving, by the terminal device, the configuration information sent by the network device by using one of broadcast signaling, remaining minimum system information RMSI and system information.

3. The method according to claim 1, wherein the receiving, by the terminal device, configuration information sent by the network device comprises:
   receiving, by the terminal device, the configuration information sent by the network device by using high layer signaling.

4. The method according to claim 1, wherein the configuration information comprises configuration information for transmitting a sounding reference signal SRS on the first uplink carrier.

5. The method according to claim 1, wherein the configuration information comprises configuration information for transmitting a physical uplink shared channel PUSCH on the first uplink carrier or a physical uplink control channel PUCCH on the first uplink carrier.

6. The method according to claim 1, wherein the configuration information is used to indicate a first random access resource and/or the first random access code for the random access process on the first uplink carrier.

7. The method according to claim 6, wherein the configuration information indicates a frequency domain position of the random access resource relative to a reference carrier position.

8. The method according to claim 7, wherein
   the reference carrier position is a carrier position of the first uplink carrier; or
   the reference carrier position is a carrier position of an uplink carrier other than the first uplink carrier of the plurality of uplink carriers; or the reference carrier position is a carrier position of a downlink carrier of the terminal device.

9. The method according to claim 6, wherein configuration signaling to which the configuration information belongs is further used to indicate: a second random access resource and/or the second random access code for the random access process on the second uplink carrier, wherein the second random access resource is the same as the first random access resource.

10. The method according to claim 1, wherein the indication information is carried in the configuration signaling to which the configuration information belongs; or
the indication information is sent by using one of broadcast signaling, RMSI and system information.

11. The method according to claim 1, wherein the plurality of uplink carriers that can be used for the terminal device respectively belongs to a plurality of different frequency bands.

12. The method according to claim 11, wherein a frequency band to which the first uplink carrier belongs is lower than frequency bands to which other uplink carriers in the plurality of uplink carriers belong.

13. The method according to claim 1, wherein the first uplink carrier is a supplementary uplink (SUL) carrier.

14. A terminal device, comprising a processor and a transceiver, wherein the processor is configured to control the transceiver to:
receive configuration information sent by a network device,
wherein the configuration information comprises resource information associated with a first uplink carrier that is one of a plurality of uplink carriers that can be used for the terminal device, and
wherein the resource information comprises (i) carrier position information of the first uplink carrier and (ii) bandwidth information of the first uplink carrier, the bandwidth information comprising an initial access bandwidth of the first uplink carrier or a reference bandwidth of a relative reference object of the first uplink carrier; and
wherein a parameter is used for the terminal device to acquire a DL signal threshold corresponding to an uplink carrier; and
wherein the terminal device determines, based on the parameter, to perform uplink transmission on the first uplink carrier; and
perform uplink transmission on the first uplink carrier based on the configuration information,
wherein when a value of a DL signal is greater than or equal to the DL signal threshold, the first uplink carrier is selected to perform a random access process, and when the value of the DL signal is less than the DL signal threshold, a second uplink carrier is selected to perform the random access process; and
wherein the first uplink carrier has a first random access code the same as a second random access code of the second uplink carrier.

* * * * *